United States Patent

[11] 3,595,073

[72] Inventor David Gwilym Orwel Morris
Flat C, 5 Kensington, Church St., London, W.8, England
[21] Appl. No. 721,864
[22] Filed Apr. 16, 1968
[45] Patented July 27, 1971
[32] Priority Apr. 19, 1967
[33] Great Britain
[31] 17890/67

[54] METHODS AND ARRANGEMENTS FOR TESTING INDUCTION MOTORS
19 Claims, 7 Drawing Figs.

[52] U.S. Cl. .................................................. 73/134, 73/136 R
[51] Int. Cl. .................................................. G01l 3/22
[50] Field of Search .................................... 73/134, 135, 136

[56] References Cited
UNITED STATES PATENTS
| | | | |
|---|---|---|---|
| 1,482,706 | 2/1924 | Short .......................... | 73/134 X |
| 2,511,674 | 6/1950 | Martin ........................ | 73/136 |

FOREIGN PATENTS
| | | | |
|---|---|---|---|
| 647,150 | 7/1928 | France ........................ | 73/136 |
| 1,245,001 | 9/1960 | France ........................ | 73/136 |
| 873,701 | 7/1961 | Great Britain ............... | 73/134 |

Primary Examiner—Charles A. Ruehl
Attorney—Sughrue, Rothwell, Mion, Zinn and Macpeak ABSTRACT: Method apparatus Apparatus for testing induction machines by the back-to-back technique. The shafts of the motors are coupled together such that they will turn in the same direction through a motor or motor and gearbox combination. The motor or motor and gearbox combination enables the torques in the shafts of the motors being tested to be balanced.

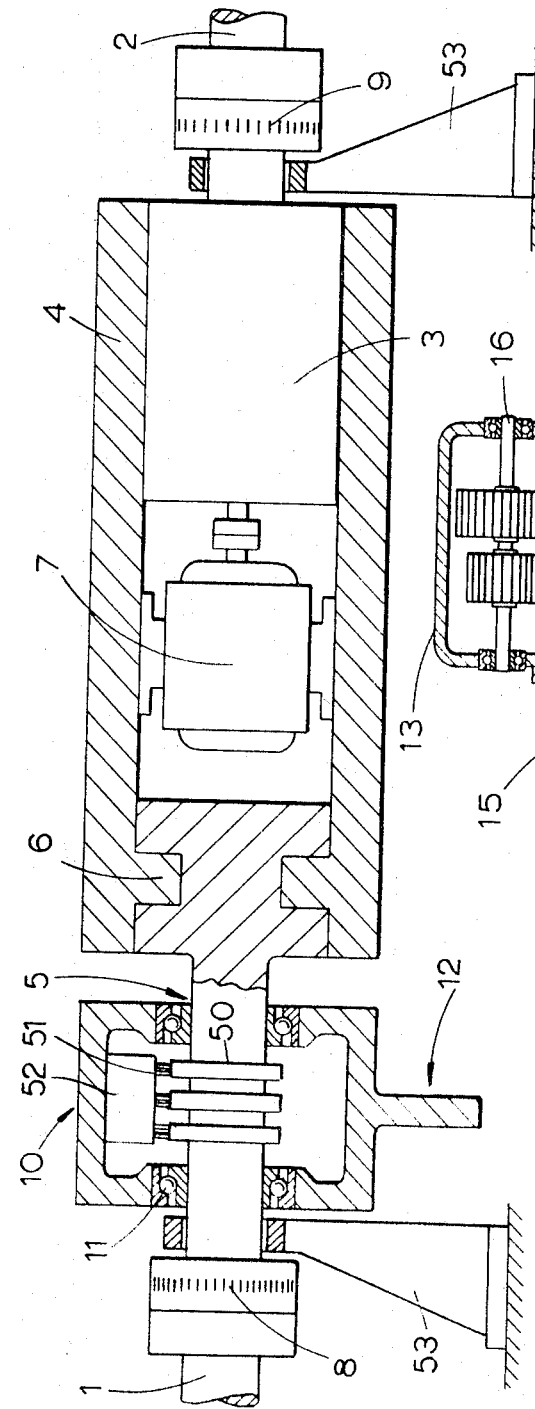
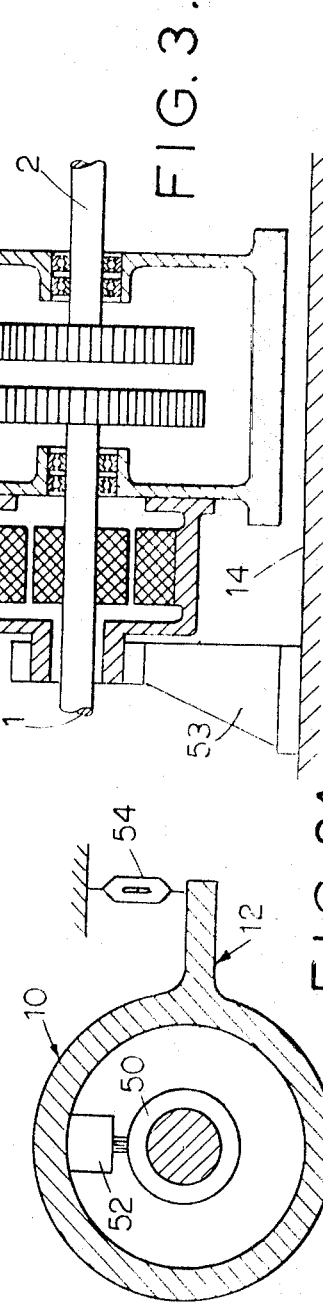
FIG. 2.
FIG. 2A.
FIG. 3.

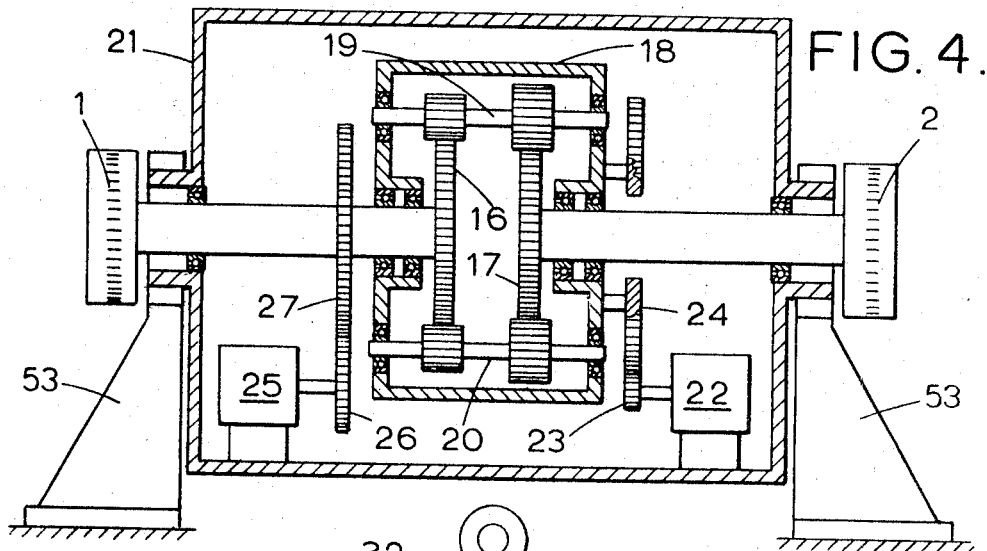
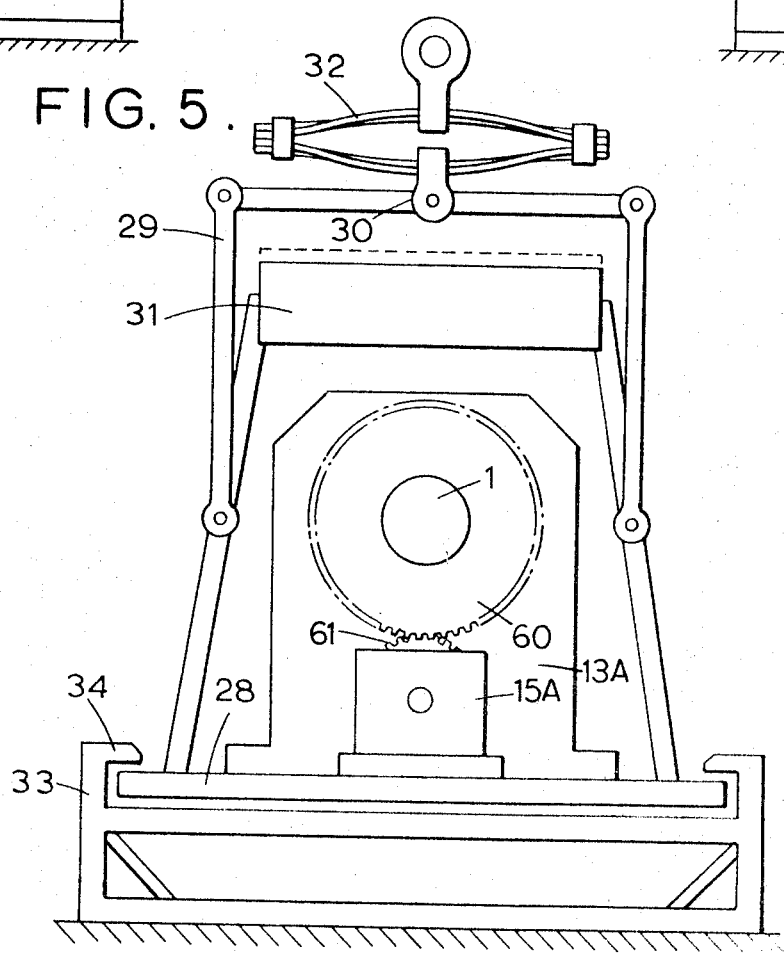

METHODS AND ARRANGEMENTS FOR TESTING INDUCTION MOTORS

The invention relates to methods and arrangements for testing induction motors.

The testing of induction motors by direct loading, in particular the testing of large induction motors, is hampered by the requirements of loading equipment and of heavy demands on the power supply. This led to methods of testing based on the application of the circulating power principle to the loading of induction motors. The circulating power principle is well known in application to tests on DC machines, transformers and synchronous machines, and such tests are alternatively described in the literature as Hopkinson, back-to-back, differential, opposition, regenerative, feed back or pump-back tests; see for example, Kloeffler, Brenneman and Kerchner, "Direct Current Machinery", page 261, MacMillan, New York 1934. In one application of this principle to the loading and testing of induction motors, two induction machines are mechanically coupled by belts or gears in such a way that one runs subsynchronously as a motor while the other runs supersynchronously as a generator to return electric power to the power supply. See T. H. Morgan et al. Transactions A.I.E.E., 1934, (53) p.p. 286—90. In another such method the two machines are coupled one to each of the two coaxial shafts of a differential gear the third shaft of which is propelled by a separate smaller motor to produce a braking effect in one induction machine and a motoring effect in the other induction machine (British Pat. No. 873,701). The two induction machines rotate in opposite directions but because one acts as a motor and the other as a brake their torques act additively on the housing of the differential gear, which has to be securely fastened to the main baseplate. In fact, if gear losses are neglected, the reaction in the fastening may be used to provide an approximate measure of the torque as described in U.S. Pat. No. 2,511,674 and French Pat. No. 647,150. As in all the then previous applications of the circulating power principle to the testing of induction motors, accurate measurements are hampered by the necessity of taking into consideration the extraneous losses in the mechanical coupling means.

The power supply and mechanical-coupling means cause one machine to run as a motor at a speed a little below synchronous speed and the other machine to run as a brake at a speed a little above synchronous speed. The calculation or measurement of the losses in the mechanical-coupling means is uncertain and arduous and it is desirable to arrange the test so that these extraneous losses are compensated in such a way that they do not figure in the calculations on the machines under test. This led to a method based on a principle of torque balance, in which the machine stators are strapped together and supported so that they are free to rotate, the power being supplied to one shaft and extracted from the other. See B. Adkins and N. Christofides, Proceedings I.E.E., 1966 (113) p.p 1995—6. The method enables accurate measurements to be made, but is hampered by the necessity of using large auxiliary machines to circulate the full power through the machines under test.

According to the present invention there is provided a method of testing an induction machine using a power source of lower power rating than the machine to be tested, comprising the steps of coupling the rotor of the induction machine to be tested through a mechanical-coupling means to the rotor of a similar induction machine or of a synchronous machine, connecting the stators electrically, providing meters between the stators and an electrical power source to measure the joint stator electrical power input, operating the two machines with different and measured rotor speeds as motor and generator in a joint test to produce loading economically on the circulating power principle, the rotors rotating in the same sense with their torques opposed and the system balanced, measuring the machine speeds and said torques to determine the joint rotor mechanical power input independently of the power losses in the mechanical-coupling means, adding the joint stator electrical power input to the joint rotor mechanical power input to determine the joint power loss in the two machines, and allocating a portion of the joint power loss to the induction machine being tested.

If the simplest version of the general arrangement according to the invention is first considered, the machine to be tested and the machine by which it is to be loaded are mounted so that they can be coupled coaxially through a mechanical-coupling means. The stators are connected in parallel to an electric power supply in such manner that each machine tends to drive the rotor system in the same direction at nearly synchronous speed. In the loading condition, the mechanical-coupling means modifies these speeds, causing one machine to operate as a motor at a speed $\omega_1$ below synchronism and the other machine to operate as a generator at a speed $\omega_2$ above synchronism. The power flow then consists mainly of a circulation round a path that includes the machines, the mechanical-coupling means, and the electrical connections between the two stators. Meters are placed in the connections to one machine to register the power circulation and the electrical conditions of test. The electric supply line provides a much smaller power flow, of the order of the losses, and meters are placed in the supply line to register this power flow $W_e$ and the electrical conditions of test. These electrical connections correspond to well-known methods of conducting the back-to-back test on electrical machines in accordance with the circulating power principle.

In the arrangements according to the present invention, a small power flow is also provided via a motor or motors within the mechanical-coupling means. Provision is made for the mechanical measurement of the portion $W_m$ of this power flow that leaves the mechanical-coupling means via the shafts of the two machines under joint test. The total power loss in the two machines under joint test is then $W_j = W_e + W_m$. The system is said to be balanced when the rotors of the main machines run steadily without angular acceleration and without unmeasured rotational constraints. (e.g. the mechanical-coupling means is not against stops).

In the simplest case, the mechanical-coupling means makes effective mechanical contact only with the shafts of the two main machines, and at balance the main machine torques are therefore in opposition and equal in magnitude. This state of balanced machine torques associated with different speeds $\omega_1$ for the motor and $\omega_2$ for the generator is achieved by control of a motor or motors lying entirely within the mechanical-coupling means and not having effective mechanical contact with any fixed supports. The torque magnitude $T$ common to the two machines is measured on a main torque transducer. Then, irrespective of the precise nature of the mechanical-coupling means, the joint mechanical power input to the rotors of the two machines under test may be written $W_m = T(\omega_1 - \omega_2)$. This is added to $W_e$ to give the joint power loss $W_j$.

It is to be noted that the joint power loss determination is independent of friction losses or other power transformations that take place within the mechanical-coupling means, and that this is achieved by application of the torque-balance principle.

The torque balance may be alternatively conducted in the presence of a small known torque bias $T_o$ applied to one of the main shafts by sensitive auxiliary dynamometric means. Then if $T_o$ is applied in the forward or motoring direction to the motor, the joint mechanical power input to the rotors becomes $W_m = t(\omega_1 - \omega_2) + T_o\omega_1$. If desired, the joint electrical power input to the stators may now be made zero by adjusting the bias torque $T_o$ while observing the wattmeters in the electrical supply line. The values of the variables in this condition may then be substituted in the above formula for $W_m$, and with $W_e = 0$ we then have $W_j = W_m$. If otherwise desired, the joint mechanical power input $W_m$ to the rotors may be reduced to zero by reversing the bias torque and adjusting it until $T_o/T = (\omega_1 - \omega_2)/\omega_1$. On reading the value of $W_e$ when $W_m = 0$ we then have $W_j = W_e$. By either of these procedures, the joint power loss may be measured directly, as previously without power-differencing, and now without the necessity of calibrating electrical against mechanical instruments.

Alternatively, the torque bias may be applied to the mechanical-coupling means itself, particularly in those arrangements having a housing which, although not fixed to any nonrotating support, can be adjusted to remain stationary. In this case, the motor torque magnitude $T_1$ and the generator torque magnitude $T_2$ differ by the magnitude of the known bias torque $T_o$. If $T_o$ is applied to the housing in the direction of shaft rotation then, from the equilibrium condition of the mechanical-coupling means, $T_o + T_1 = T_2$. It may be noted that the generator torque and the generator speed are in this case both greater than the corresponding motor values, the necessary power to hold this condition being derived from the motor or motors within the mechanical-coupling means. It is further to be noted that, provided this condition is achieved as postulated, the torque-balance equation can be derived independently of any knowledge of the internal arrangements of the mechanical-coupling means. The joint mechanical power input to the rotors may then be written $W_m = \omega_2 T_2 - \omega_1 T_1$. Using the torque-balance equation above, this may be rewritten in alternative forms involving only one main torque measurement, thus $W_m = T_1(\omega_2 - \omega_1) + T_o \omega_2 = T_2(\omega_2 - \omega_1) + T_o \omega_1$. The torque measurements required for the determination of $W_m$ are therefore $T_o$ and either $T_1$ or $T_2$. As in the previous case discussed, the torque bias may be varied or reversed to provide a choice of operating conditions.

In the absence of torque bias, the mechanical powers of the induction machines and the net power derived from the mechanical-coupling means are in direct proportion to the individual speeds of the machines and to the speed difference, and all three speeds can be measured to any degree of accuracy that is called for by the requirements of machine testing. The absolute values of the three powers are obtained by multiplying speeds by the torque which is the same throughout and may be measured by means of a torque transducer carried for instance either in the coupling means or in the fixings of one of the stators of the mechanically coupled machine. The difference power is thus measured as easily and as accurately as the individual powers of the machines under test, the percentage accuracy being practically the same as the percentage accuracy of the torque measurement.

It is to be noted that the elimination from the calculations of the mechanical losses in the mechanical-coupling means is achieved by motorizing the coupling means to enable the principle of torque balance to be applied. Basically, the mechanical-loss problem is bypassed in an arrangement that requires one torque measurement only, as described above. This is in contrast with another method of allowing for mechanical losses that requires two torque measurements and is described in French Pat. No. 1,245,001. In the system according to the present invention, a second measured torque is in some cases introduced, but this is in the form of a bias torque for the purpose of providing an additional facility. This facility may be achieved by applying the bias either to one of the main shafts or to the housing of the coupling means. When the bias torque is applied to the housing, for a given pair of shaft speeds it may be positive, negative or zero, according to control exercised by a motor or motors within the mechanical-coupling means. The utility of this facility is that for given shaft speeds the torques and electrical inputs of the main machines may be varied by the small amounts required to standardize their test conditions.

The torque bias feature provides the control over exact operating conditions that is desirable if the loss difference is to be determined in two induction motors 'A' and 'B' of similar ratings but different designs by running them in succession against a third test-bed machine 'C'. With machine 'C' running as a generator in exactly the same conditions in the two tests, the facilities enable a choice to be made of the motor conditions that are to be made identical in the two tests. The difference in the losses of machines 'A' and 'B' is then derived as the difference between the accurately measurable gross losses. In the above loss-difference test, it is immaterial whether the test-bed machine 'C' is an induction machine or a synchronous machine.

A major problem in the back-to-back testing of induction machines is the apportionment of the known total loss between the motoring and generating machines. However, with the joint loss measured directly, first order errors due to input and output power-differencing are eliminated, and the apportionment of the accurately known joint loss can then be made on theoretical grounds, and this involves only second order errors.

If the loss apportionment is to be carried out without resource to machine theory, experimental difficulties arise comparable with those associated with a simple input/output test. Whereas the above loss-difference test is well adapted to the needs of competitive trading, more elaborate procedures would be justifiable for investigational work of wide application on the loss apportionment problem. The apparatus hitherto here described enables measurements to be made that are independent of mechanical coupling loss, and in this respect puts the back-to-back test for induction machines on a par with the back-to-back test for synchronous machines. See for example J. Hopkinson and E. Wilson, Phil, Proc. Roy. Soc., Vol 187, p. 229, 1896. However, the apportionment of the losses between motor and generator is simpler in the case of synchronous machines, because of the absence of speed difference and AC magnetizing current. The separation is made still simpler if the synchronous machines are operated in their linear regime. By using an induction motor working at its rated voltage and a synchronous machine working below its rated voltage, and testing them back-to-back for both directions of power circulation, the loss apportionment problem for induction machines can be reduced to the simpler loss apportionment problem for synchronous machines. The apparatus here described is well adapted for such tests, whereas ordinary gearing would contribute losses to the figuring which would necessarily be different for the two directions of power circulation.

According to one arrangement of the invention the coupling means may be designed as a motorized coupling that embodies an auxiliary motor to impose a speedsplit between the two coaxial halves of the coupling. The power for the auxiliary motor is fed through brushes pressing on sliprings and the associated friction torque may be measured and taken into consideration as a correction when significant. In one form of this arrangement the coupling may be designed as a motor housing containing a number of pairs of planetary gears. The housing may be given contrarotation to reduce its absolute speed and centrifugal stress.

According to another arrangement of the invention the coupling means may be designed as a floating gearbox that embodies an auxiliary motor to prevent the rotation of the gearbox housing. The weight of the gearbox is supported on its own main shafts or by trunnions on its housing carried in bearings arranged to give negligible rotational constraint or on an equivalent platform. The auxiliary motor is then arranged to exert a torque between the gearbox housing and one of the gearbox shafts. Power is fed to the auxiliary motor through flexible leads and its amount is adjusted until the gearbox housing is floating freely while showing no tendency to rotate. The torques on the two induction machines are then equal and opposite and may be measured as described above.

In one form of the floating gearbox arrangement a close-ratio gearbox is used such that the output speed is greater than the input speed in a fixed ratio that depends upon the wheels employed. The ratio is chosen to suit the induction machine loading that is required and can be changed by changing the wheels in the gearbox.

In another form of the floating gearbox arrangement, a double-input gearbox is used such that the output shaft rotates coaxially in the same direction as the main input shaft with the addition or subtraction of a small variable extra rotation derived from a second auxiliary motor. The ratio between the rotations of the main shafts when the auxiliary motor is stationary may be either unity or nearly unity. The output shaft can be made to rotate at a higher speed than the input shaft, which causes the first machine being tested on the input shaft to exert a motoring action, while the second machine being tested on the output shaft exerts a braking action. When the required value of power circulation has been set by adjustment of the second auxiliary motor the first auxiliary motor is adjusted to equalize the torques as described above, and the torque and speed measurements can then be made. Power is fed to the two auxiliary motors through flexible leads. The second auxiliary motor enables the loading for the test to be set at any required value within a continuous range.

In the drawings five embodiments of devices for carrying out tests according to the invention are shown schematically by way of example.

FIG. 2 shows the principle of a motorized coupling.

FIG. 2A is a cross-sectional view of housing 10 of FIG. 2 showing the means for restraining the rotation thereof.

FIG. 3 shows the principle of a floating close-ratio gearbox.

FIG. 4 shows the principle of a floating double-input gearbox.

FIG. 5 shows a platform for supporting gearbox and coupling assemblies without rotational constraint.

Figure 1:
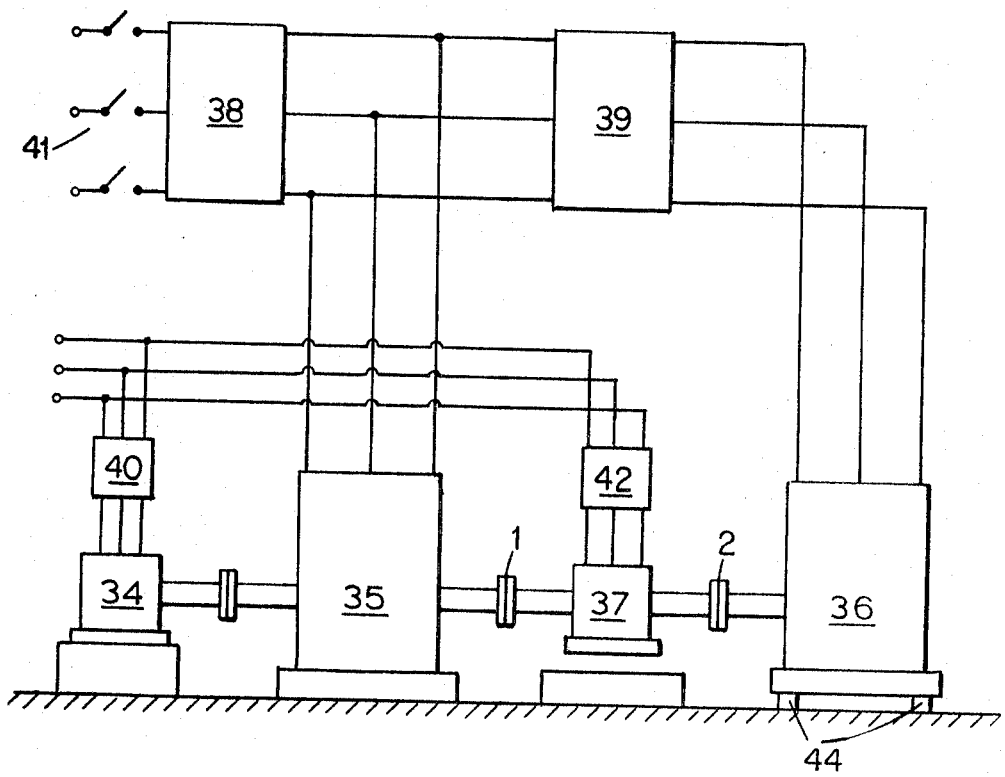
FIG. 1 shows apparatus for testing two machines by the present method.
Figure 6:
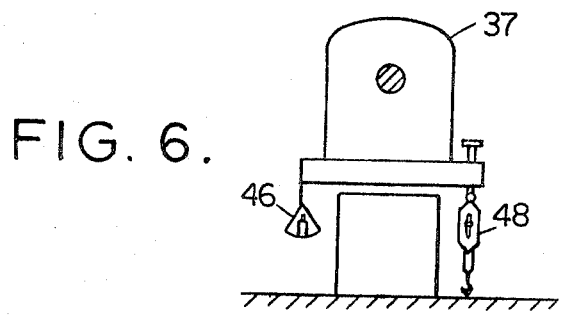
FIG. 6 is an end view of the coupling means of FIG. 1 showing one type of auxiliary dynamometric means used.

FIG. 1 shows apparatus for carrying out the method of the present invention with the appropriate electrical and mechanical connections. Two main machines 35 and 36 under joint test have their respective motor shafts 1 and 2 connected by coupling means 37 which may be any of those described hereinafter. A dynamometer 34 may be provided in some cases for applying torque bias to the rotating shaft 1. Wattmeters and other meters provided in position 38 are provided for measuring losses and have appropriate ranges for measuring such losses and wattmeters and other meters provided in position 39 are provided for measuring the full power circulation and have ranges appropriate therefor. The meters are supplied with electrical current through a switch 41 in accordance with the conventional electrical connections for carrying out the back-to-back test on the power circulation principle. The dynamometer 34, when present and the coupling means 37 are provided with independent electrical supplies through appropriate conventional control means 40 and 42, respectively. The control means 42 enables the total torque on the mechanically coupled rotor system to be adjusted to zero. In those cases in which torque bias is applied by the dynamometer 34 to the machine 35 it may be measured in conventional manner in the shafting or at an interface between the dynamometer and its support and the main torque on the machine may be measured in likewise conventional manner. When torque bias is applied through a housing of the coupling means 37 the torque may be measured by load cells 44 placed under the base of one of the main machines 36, as illustrated in FIG. 1, or in the manner described hereinafter with reference to FIGS. 3 and 4.

In carrying out the present method a mechanical path exists from the machine 35 to the machine 36 through the coupling means 37 while an electrical path exists from the machine 36 to the machine 35 through the meters 39. Power to make up for the losses may enter these paths either mechanically through the coupling means 37 or the dynamometer 34, if present, or electrically through the meters 38.

In carrying out the present method, the loss in the two machines is directly measured as the sum of an electrical and a mechanical input. The loss may be supplied and measured entirely mechanically by providing the dynamometer 34 acting on either of the main shafts of the coupling means or on either shaft extension of either of the machines under test. By adjustment of the dynamometer 34 and the coupling means 37 the reading of the meters 38 may be reduced to zero for any desired loading condition. The loss is then the sum of the powers provided by the dynamometer and the coupling means. Alternatively, by reversing the dynamometer torque, the loss may be supplied entirely electrically by arranging the power withdrawn by the dynamometer 34 to be equal to the power injected by the coupling means 37. By other adjustments of the dynamometer the power for the make up of the losses may be supplied electrically and mechanically in any other ratio, positive or negative.

Turning now to discussion of the various coupling means, FIG. 2 shows two induction motor shafts coupled by a coaxial gearbox 3, tubular yoke 4 and stub shaft 5 through boss 6 which contains a torque transducer, for instance in the nature of a spring. The supply or splitter motor 7 within yoke 4 drives the input shaft of coaxial gearbox 3 to cause relative rotation of the output shaft at split speed and thus a speed difference between motor shafts 1 and 2. The coupling flanges 8 and 9 may have stroboscopic marks for the ready determination of speeds. The brush-housing 10 supports brushes 51, supported by brush holders 52 mounted in housing 10, and pressing on sliprings 50 connected to the torque-transducer 6 and the splitter-motor 7. The housing 10 is supported on shaft 5 through bearings 11. The restraining torque preventing rotation of the brush housing can be applied exclusively via a special torque arm 12. This torque may be measured by use of a sensitive spring balance 54, which is secured to a stationary support or member, as illustrated in FIG. 2A, thereby preventing rotation of the brush-housing 10, or pendulum weight and if of significant value, can be applied as a correction to the main measurement the entire mechanical-coupling coupling means may be supported on pedestal bearing assemblies 53, located at either end of the mechanical-coupling means, in order to reduce the frictional losses and obtain better results.

FIG. 3 shows an arrangement of the mechanical-coupling means designed as a floating gearbox. A close-ratio gearbox 13 is shown as suspended over a test-bed 14 from main shafts 1 and 2. A balancing or torque-nulling motor 15 is bolted to the gearbox housing and exerts torque on the main shaft 1 coupled to one of the main motors under test. Consequently, a reaction torque is exerted on the gearbox housing, and this may be adjusted to hold the housing at rest. Alternatively, the rotor of the balancing-motor could be arranged to exert its torque on the main shaft 2 or on the lay-shaft. As in all cases, torque bias may be applied to the system by a sensitive auxiliary dynamometer 34 (FIG. 1) acting between a fixed structure and one of the main shafts in the mechanically coupled rotor system. However, since this form of the mechanical-coupling means operates with its housing at rest, the torque bias may in this case be more readily applied gravimetrically, or by a sensitive auxiliary dynamometric means acting between a fixed structure and the gearbox housing.

Referring now to FIG. 4, two comparably rated machines not shown have their rotors coupled respectively to the input shaft 1 and the output shaft 2 of a close-ratio double-input gear-assembly which is of the epicyclic kind having a first sunwheel 16 and a second sunwheel 17 disposed within an annular carriage 18. To provide a close-ratio action between the two main shafts the two sunwheels differ slightly in size, and the larger sunwheel 16 and the smaller sunwheel 17 engage with appropriate pinions on layshafts such as the one indicated by reference numeral 19 and another by the reference numeral 20. Each layshaft carries two pinions each meshing directly with one of the sunwheels. To provide the second input, the layshafts can be given a planetary motion by rotation of the annular carriage 18 with respect to the floating housing 21, the drive being provided by an auxiliary motor 22 acting through gears 23,24. Thus it will be seen that if sunwheel 16 for example, is rotated in one direction and the annular carriage 18 is held stationary, then sunwheel 17 will rotate in the same direction at a higher speed. This identity of direction for the main rotations is an essential feature of this form of the invention since it enables a torque balance to be obtained as a basis for the loss measurements. A second input can be added by driving motor 22 to rotate the annular cage 18, and the output shaft can then be made to rotate in the same direction but at a still higher speed than the coaxial input shaft. Alternatively, if the rotation of motor 22 is reversed the speed difference between shafts 1 and 2 may be reduced or reversed. For example, two identical induction motors can be run at their normal no-load speed by driving the cage at the same no-load speed in the same direction. To obtain the torque balance, a motor 25 is used to apply a torque between the floating housing 21 and one of the main shafts. This torque may be applied directly or through gears 26 and 27. The rotation of the housing 21 may be limited by stops and the power may be fed to motors 22 and 25 by means of flexible leads. When the required level of loading has been set by control of motor 22 the torque balance is obtained by adjustment of motor 25. The speeds and the common torque are then measured and the joint loss calculated as above. Torque bias can be readily applied to the system of FIG. 4 since the considerations that apply are the same as already described in connection with FIG. 3.

Alternatively, a double-input gear assembly having unit ratio between the unboosted main shaft speeds may be used, for example by using a differential gear such as that described in British Pat. No. 873,701 and adding a reversing gear in one of the main shafts.

As illustrated in FIGS. 3 and 4, trunnion and shaft bearing support pedestals 53 may be used to support the shaft coupling means, as described above with reference to FIG. 2.

FIG. 5 illustrates a platform 28 that may be used to support the weight of any coupling arrangement of gearboxes and auxiliary motors, while imposing negligible rotational constraint. FIG. 5 shows an embodiment in which a coupling means 13A, similar to the close ratio gearbox 13 of FIG. 3 is mounted on the platform 28. In contradistinction to the embodiment shown in FIG. 3, a motor 15A is not bolted to the gearbox housing but is mounted on the concentrically rotatable platform 28. A gearwheel 60 is mounted on the shaft 1 and meshes with a pinion 61 of the motor 15A. The virtual pivot of the platform is made to coincide with the actual pivot of the gearbox assembly, i.e. the centerline of the shafts of the shafts of the induction motors under test. The platform 28 is hung by a parallelogram linkage 29 from a suspension pivot 30. The position of the center of gravity is regulated by counterpoise 31. Spring 32 is included in the suspension to minimize stresses due to any settling in the support. Damping arrangements may also be added to the suspension. Stops 33 and 34a limit horizontal, vertical and rotational movements of the platform.

Alternatively, in the floating gearbox methods, accurately measurable mechanical powers may be withdrawn from the computationally significant part of the system without the use of an additional motor, by applying a measured bias torque to the floating member, for example by using a spring balance to restrain housing 13 in FIG. 3 or housing 21 in FIG. 4. When the spring balance is in position, its restraint can be brought into effect by reducing the torque imposed by the balancing motor 15 or 25. Alternatively, measurable mechanical power can be injected into these systems by moving the spring balance to the other side of the floating housing and increasing the torque imposed by the balancing motor. By these means the balancing motors 15 or 25 take over the function of the dynamometer machine in FIG. 1.

I claim:

1. A method of testing an induction machine using a power source of lower power rating than the machine to be tested, comprising the steps of coupling the rotor of the induction machine to be tested through a mechanical coupling means to the rotor of a similar induction machine or of a synchronous machine, connecting the stators electrically, providing meters between the stators and an electrical power source to measure the joint stator electrical power input, operating the two machines with different and measured rotor speeds as motor and generator in a joint test to produce loading economically on the circulating power principle, rotating the rotors in the same sense with their torques opposed and with the system balanced, measuring the machine speeds and said torques to determine the joint rotor mechanical power input independently of the power losses in the mechanical coupling means, adding the joint stator electrical power input to the joint rotor mechanical power input to determine the joint power loss in the two machines, and allocating a portion of the joint power loss to the induction machine being tested.

2. A method as claimed in claim 1, wherein the two machines are run with opposing torques arranged to be equal in magnitude, the common torque therebetween being measured by a torque transducer.

3. A method as claimed in claim 1, wherein the two machines are run with opposing torques approximately equal in magnitude, and wherein torque equality is achieved in the presence of auxiliary dynamometric means, supplying a supplementary bias torque to the mechanically coupled rotor system by the auxiliary dynamometric means.

4. A method as claimed in claim 1, wherein in order to enable the difference in the losses of two different induction machines to be evaluated, each of them is run in turn against the same similar induction machine or synchronous machine, which is held in exactly the same electrical and mechanical condition in the two tests.

5. A method as claimed in claim 1, wherein the difference in the losses of an induction machine when operated first as a motor and then with equal but opposite torque as a generator is approximately determined by running it in successive circulating power tests against a synchronous machine.

6. Apparatus for testing an induction machine, comprising an induction machine or synchronous machine similar to the machine to be tested, mechanical coupling means for connecting the rotor shaft of the machine to be tested to the rotor shaft of said similar machine so that the machine torques are opposed, the coupling means being constructed to enable the said shafts to rotate in the same sense with accurately measurable different speeds and with the system in balance, electrical connections for connecting the stators of the two machines, first meters for measuring the joint stator electrical power input, second meters for measuring the electrical power of either one of the machines, means for connecting the two machines to an electrical power source through said first and second meters, and main torque transducer means for measuring the magnitude of one of the machine torques when the system is in balance.

7. Apparatus as claimed in claim 6 wherein auxiliary dynamometric-means are provided for applying a known bias torque to the mechanically coupled rotor system in such a way that the sum of the bias torque and the machine torques can be adjusted to zero.

8. Apparatus as claimed in claim 6 wherein the housing member of an auxiliary motor is coupled to the shaft of the machine to be tested, and the shaft of the core member of the motor is coupled to the shaft of the said similar machine.

9. Apparatus as claimed in claim 8, wherein the auxiliary motor shaft is coupled to said similar machine shaft through a gearbox, the gearbox housing being fastened to and free to rotate with the housing of the motor.

10. Apparatus as claimed in claim 9 wherein sliprings are provided on or adjacent to the auxiliary motor housing for electrical connections to the main torque transducer and the motor, brushes for the sliprings being carried in a brush-housing mounted on bearings on the shaft, and wherein means are provided for restraining rotation of the brush-housing and thus measuring the torque imposed by the brush assembly on the mechanically coupled rotor system.

11. Apparatus as claimed in claim 6, wherein the mechanical coupling means includes a close-ratio gearbox and an auxiliary balancing motor arranged to apply torque between a housing of the gearbox and one of the shafts thereof, the auxiliary balancing motor serving to hold said housing stationary and to provide the only constraint thereon.

12. Apparatus as claimed in claim 11, wherein auxiliary dynamometric-means are provided for applying a known bias torque between a fixed structure and a rotating member of the mechanically coupled rotor system.

13. Apparatus as claimed in claim 11, wherein auxiliary dynamometric-means are provided for applying a known bias torque between a fixed structure and the gearbox housing.

14. Apparatus as claimed in claim 6, wherein the mechanical coupling means includes a double-input gearbox having a housing which is free from rotational constraint by any fixed structure external to the housing, the gearbox having main shafts which are coaxial and arranged to rotate in the same sense when an auxiliary shaft means of the gearbox is stationary, the speed difference between the main shafts being adjustable by rotation of said auxiliary shaft means, said auxiliary shaft means being coupled to the rotor of an auxiliary motor the stator of which is carried on the housing, and an auxiliary balancing motor acting between the housing and one of the shafts of said machines serving to balance the torque on the housing.

15. Apparatus as claimed in claim 14, wherein auxiliary dynamometric-means are provided for applying a known bias torque between a fixed structure and a rotating member in the mechanically coupled rotor system.

16. Apparatus as claimed in claim 14, wherein auxiliary dynamometric-means are provided for applying a known bias torque between a fixed structure and said housing.

17. Apparatus as claimed in claim 16, wherein the mechanical-coupling means are supported on the auxiliary dynamometric-means.

18. Apparatus as claimed in claim 14, wherein the mechanical-coupling-means are supported on bearings.

19. Apparatus as claimed in claim 14, wherein the mechanical-coupling means are supported on a concentrically rotatable platform.